United States Patent [19]
Eichenauer

[11] 4,031,728
[45] June 28, 1977

[54] STEERING COLUMN AND IGNITION LOCK FOR MOTOR VEHICLE

[76] Inventor: Rudolf Eichenauer, Hollbergstrasse 1, Frankfurt am Main, Germany, D-6000

[22] Filed: May 17, 1976

[21] Appl. No.: 687,009

[30] Foreign Application Priority Data
Feb. 25, 1976 Germany .......................... 2607609

[52] U.S. Cl. .................................. 70/252; 70/180
[51] Int. Cl.² ......................................... B60R 25/02
[58] Field of Search ................... 70/252, 186, 239; 200/44

[56] References Cited
UNITED STATES PATENTS

| | | | |
|---|---|---|---|
| 3,650,131 | 3/1972 | Eichenauer | 70/252 |
| 3,739,610 | 6/1973 | Rokku | 70/252 |
| 3,919,867 | 11/1975 | Lipschutz | 70/186 |
| 3,919,868 | 11/1975 | Lipschutz | 70/239 |
| 3,940,958 | 3/1976 | Kuroki | 70/252 |

FOREIGN PATENTS OR APPLICATIONS

| | | | |
|---|---|---|---|
| 2,133,734 | 1/1973 | Germany | 70/252 |
| 2,351,099 | 5/1974 | Germany | 70/252 |
| 1,411,377 | 10/1975 | United Kingdom | 70/252 |

Primary Examiner—J. Franklin Foss
Attorney, Agent, or Firm—Kurt Kelman

[57] ABSTRACT

A coincidental lock for a motor vehicle comprises a key controlled lock cylinder mounted in the axial bore of a housing for axial displacement between an inward and an outward position, and for rotation in the inward position into selected operating positions. A lock bolt is mounted in a cross bore of the housing for displacement between a retracted position and a locking position, the bolt having a keeper engaging the steering column of the vehicle in the locking position. The lock bolt is displaced between these positions by a driving member operated by the rotation of the lock cylinder against the bias of an operating spring biassing the lock bolt into the locking position. A latch having a wedge face is mounted on the lock bolt for pivoting in the direction of the keeper against the bias of a soft spring. The lock cylinder has an end rim adjacent the bolt and the latch is arranged to wedge the wedge face thereof firmly against the lock cylinder rim when the bolt is in the retracted position and the lock cylinder is inwardly displaced.

10 Claims, 7 Drawing Figures

STEERING COLUMN AND IGNITION LOCK FOR MOTOR VEHICLE

The present invention relates to improvements in a lock arrangement for a motor vehicle having a steering column. As is well known, combined steering column and ignition locks, known as coincidental locks, enable the steering column of a motor car to be locked and unlocked simultaneously with the opening and closing of the ignition switch through actuation of a key controlled lock.

Conventional lock arrangements of this type comprise a housing defining an axial bore and a cross bore intersecting therewith, a key controlled lock cylinder mounted in the axial bore of the housing for axial displacement between an inwardly and an outwardly displaced position, and for rotation about the axis of the bore in the inwardly displaced position into selected operating positions, and a lock bolt mounted in the cross bore for displacement between a retracted position and a locking position. The bolt has a keeper engaging the steering column in the locking position. Actuating means is arranged to displace the lock bolt between the retracted and locking positions and includes an operating spring biassed to displace the lock bolt into the locking position and a driving member operated by the rotation of the lock cylinder to displace the bolt against the bias of the operating spring into the retracted position to disengage the keeper from the steering column. When the ignition key is inserted in the keyhole of the lock cylinder and the cylinder is rotated to retract the bolt, the inwardly displaced cylinder holds the bolt in the retracted position by means of a latch and the bolt is permitted to return to its locking position under the bias of the operating spring only when the key is withdrawn and the cylinder is outwardly displaced again.

German Offenlegungsschriften (published applications) Nos. 2,058,802 and 2,146,364 disclose lock arrangements of this general type wherein one or two shaped sliding members are arranged to project into the keyhole and, when the key is inserted thereinto, it displaces the sliding member or members to permit penetration of the key into the keyhole. Displacement of the sliding member or members displaces the lock cylinder inwardly into an axial position which enables the cylinder to be rotated into the desired operating positions.

These known lock arrangements have the disadvantage that the operator encounters the resistance of a spring biassing the lock cylinder outwardly into an inoperative axial position when he inserts the key to displace the sliding member and thus move the cylinder inwardly. The driver thus perceives the insertion of the ignition key and starting of the car to be encumbered. The spring resistance the driver has to overcome includes the bias of the latch spring which must be sufficient to maintain the latch in position even during considerable vibrations and shocks to which the vehicle may be subjected since the bolt may otherwise be accidentally returned into its locking position while the ignition is on, thus locking the steering column during driving. To avoid such a dangerous condition, the latch spring has been made fairly strong and, the stronger the latch spring bias, the stronger the outward pressure on the lock cylinder, which the driver perceives when he starts the car by pressing the cylinder inwardly with the key to enable the cylinder to be rotated.

It is the primary object of this invention to avoid these disadvantages with simple means.

It is another object of the invention to simplify the construction of the lock by reducing the number of parts.

It is also an object of the present invention to secure the steering column locking bolt in its retracted position even when subjected to strong vibrations or shocks.

With the lock arrangement of this invention, the driver will encounter no axial bias resisting the insertion of the key and he will find the lock cylinder ready for rotation in its inwardly displaced position when he wishes to start the car. Nevertheless, the spring forces are so arranged in the lock arrangement that safety is assured and the steering column will not be locked accidentally.

The above and other objects and advantages are accomplished in accordance with the invention with latch means mounted on the lock bolt for pivoting in the direction of the keeper. The latch means includes a latch having a wedge surface, a soft spring biasing the latch in a direction opposite to the pivoting direction, and the latch being arranged to wedge the wedge face thereof firmly against an end rim on the lock cylinder adjacent the bolt when the bolt is in the retracted position and the lock cylinder is in the inwardly displaced position whereby the bolt is securely maintained in the retracted position, the firm wedge being removed on withdrawal of the key from the lock cylinder and the resultant outward displacement of the lock cylinder.

With this arrangement, the relatively strong bias of the bolt operating spring serves simultaneously to wedge the latch firmly into a position wherein the latch secures the bolt in its retracted position against accidental displacement into the locking position while the inserted key holds a sliding member in a position wherein this member couples the lock cylinder to the lock barrel while in its inwardly displaced operating position.

In a preferred embodiment of the present invention, spring means automatically biases the lock cylinder inwardly towards the lock bolt and holds the cylinder in an axial position ready for rotation after the key has been withdrawn.

In this preferred embodiment, an annular collar may be provided on the inner end of the lock cylinder to constitute the end rim thereof, the collar defining a recess and the latch being arranged to be received in the recess in the locking position of the lock bolt whereby the soft latch spring is substantially tensionless and offers no resistance to the inward movement of the lock cylinder by the inserted key. The soft spring is tensioned only when the bolt has been moved into the retracted position and the end rim contacts the wedge face of the latch.

Since the soft latch spring serves only to return the pivoting latch and may, therefore, have a very weak bias, it is possible to do without the automatic return of the lock cylinder into its inward position after the key is withdrawn. In one preferred embodiment, for example, the end rim of the lock cylinder is constituted by the periphery of a cylindrical projection and a circular disc is slidingly mounted in a radial bore of the cylinder for sliding movement between a position wherein a frusto-conical wall in the lock barrel slides the disc into the keyhole in the absence of the key and out of a recess in the lock barrel, and a position wherein the inserted key slides the disc out of the keyhole and into the recess for coupling the lock cylinder to the lock barrel against axial displacement of the lock cylinder. The circular disc rolls along the flat side of the ignition key as it is inserted into the keyhole and, therefore, makes the inward displacement of the lock cylinder by means of the key easy so that the driver hardly notices the counterpressure of the soft latch key which is biassed against the lock cylinder end rim.

Compared to known lock arrangements, the embodiment without automatic lock cylinder return requires only two springs, i.e. the lock operating spring and the latch spring, thus saving a number of lock parts.

The above and other objects, advantages and features of the present invention will become more apparent from the following detailed description of certain now preferred embodiments thereof, taken in conjunction with the accompanying drawing wherein FIG. 1 is an axial section of one embodiment of a steering lock according to this invention, with the lock cylinder in partial section, the key being inserted and the steerng column locking bolt being retracted;

Figure 1:
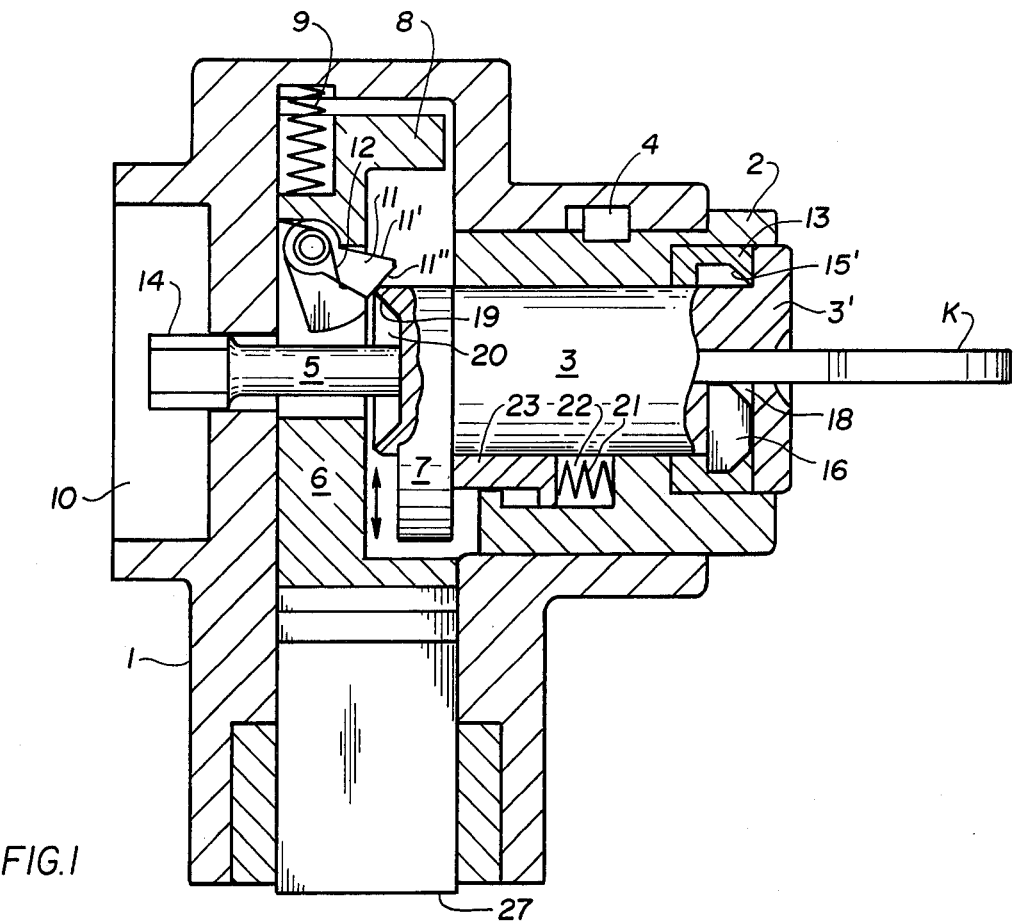
Figure 2:
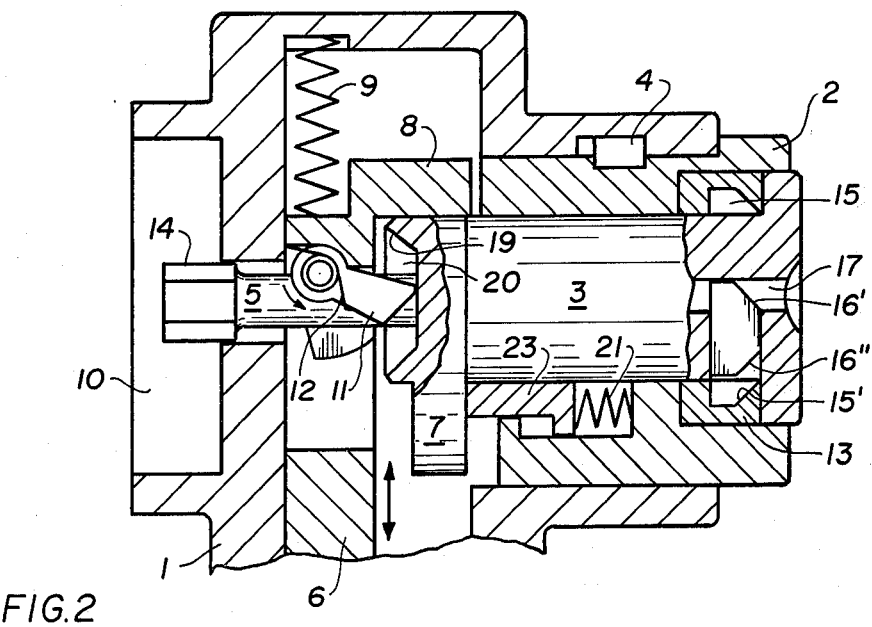
FIG. 2 is a like view of this lock embodiment, with the bolt in the locking position and the key withdrawn.

Referring now to the drawing and first to FIGS. 1 and 2, there is shown steering lock housing 1 having a bore holding lock barrel 2 which, in turn, has a bore receiving lock cylinder 3 for rotation in the lock barrel and axial displacement.

The lock barrel and cylinder are held against unauthorized removal from the housing by leaf spring 4 in a generally known manner. The outer end of lock barrel 2 defines a recessed chamber of enlarged diameter which receives head 3' of lock cylinder, ring 13 being mounted in this recessed chamber between lock cylinder head 3' and a shoulder formed in the barrel between the central bore receiving the lock cylinder and the recessed chamber of enlarged diameter. Driver element 5 extends axially from the inner end of the lock cylinder and carries a flattened end portion 14 for operating respective switches of the electrical operating circuit on switch box 10 of any conventional design for actuating the ignition and, if desired, other operations of the car.

Housing 1 also has a cross bore intersecting the axial bore in the lock barrel and holding retractible lock bolt 6 which is slidable in the cross bore between a retracted position shown in FIG. 1, wherein steel tip or keeper 27 of the bolt is removed from a matching recess in the steering column (not shown), and a locking position shown in FIG. 2, wherein the keeper of the bolt engages the steering column recess and thus locks the steering column against movement. Since coincidental locks combining control of the steering column and ignition are well known, ignition circuitry 10 has not been further illustrated or described, nor has the steering column been shown in cooperation with its locking bolt. As illustrated, driver element 5 of lock cylinder 3 passes through an elongated slot in bolt 6 and through a bore in housing 1 to enable flattened end portion 14 to operate the ignition.

With flat ignition key K removed and lock cylinder 3 in the OFF-position as shown in FIG. 2, coil spring 9 slides bolt 6 forwardly in the cross bore into a position wherein its keeper 27 engages the keeper recess in the steering column and locks the same. When it is desired to operate the car, ignition key K is inserted into keyhole 17 extending axially through the lock cylinder and the cylinder is turned by the key from the OFF-position into a ready-position. During this rotary movement of lock cylinder 3, driving cam 7, which radially extends from the cylinder, engages cam follower 8 on bolt 6 to retract the bolt against the bias of spring 9 into the position shown in FIG. 1 wherein the steering column is unlocked.

Latch 11 is mounted on lock bolt 6 in its elongated slot, the latch being constituted by a lever arm pivotal about an axis extending substantially perpendicularly to the lock cylinder and biased counterclockwise by soft spiral spring 12, the bias of soft spring 12 being opposite to that of relatively hard coil spring 9 but being much weaker. The end wall of the elongated bolt slot adjacent latch 11 forms an abutment delimiting the pivotal movement of the latch under the bias of spring 12 to determine a fixed end position of the latch, which is shown in FIG. 1, in which the latch projects from the bolt. The projecting portion of latch 11 has a first wedge face 11' and a second wedge face 11".

Ring 13, which is mounted between lock cylinder head 3' and lock barrel 2, has a radially inwardly extending flange adjacent the cylinder head and this flange has a frusto-conical face 15' defining annular recess 15 in ring 13. Radial slot 18 in lock cylinder 3 extends from keyhole 17 to recess 15, this radial slot slidably receiving wedge element 16. The wedge element has two radially spaced inclined faces 16', 16".

In the OFF-position shown in FIG. 2, wedge element 16 extends with its inclined face 16' into keyhole 17. When key K is introduced into the keyhole, the point of the key will contact inclined face 16' and, upon further inward movement of the key in the keyhole, will slide the wedge element radially outwardly out of the keyhole and into recess 15, as shown in FIG. 1.

As shown in FIGS. 1 and 2, the inner end of lock cylinder 3 adjacent bolt 6 carries annular collar 19 defining recess 20. When key K is removed and the lock is in the OFF-position illustrated in FIG. 2, with wedge element 16 radially inwardly displaced, spring-biased latch 11 projects into recess 20 and is pressed by soft spring 12 into engagement with the end face of cylinder 3 adjacent driver element 5 of the cylinder, spring 12 being substantially free of tension in this position. When the ignition key is inserted, it radially displaced wedge element 16 to lock the wedge element into position between the flat face of key K and conical face 15', with inclined face 16" of the wedge element in contact with the conical face so that the wedge element couples the lock cylinder to the lock barrel and prevents axial displacement of cylinder 3, as shown in FIG. 1. As the key is turned to rotate the lock cylinder, driving cam 7 in engagement with cam follower 8 retracts bolt 6 and unlocks the steering column. During this retracting movement of the steering column bolt from the position of FIG. 1 to the position of FIG. 2, annular collar 19 of rotating cylinder 3 will force latch 11 inwardly against bolt 6 to pivot clockwise against the weak bias of spring 12, the bolt sliding into the retracted position against the stronger bias of coil spring 9. As latch 11 rides along the bevelled wall of recess 20 and then over the rim of collar 19, and the steering column is unlocked to place the car into the ready-position for driving, wedge face 11" of latch 11 will engage the rim of the collar, thus firmly wedging the lock cylinder against axial displacement between wedge element 16 and latch 11. Latch 11 being under the counterclockwise bias of soft spring 12 which presses the latch against the limiting end wall of the elongated slot in bolt 6 into a fixed end position and simultaneously under the strong clockwise bias of hard spring 9, the axial position of lock cylinder 3 is fixed. The temporary inward displacement of latch 11 during the retraction of bolt 6 is facilitated by the camming action of the frusto-conical inner face of collar 19. Hard bolt spring 9 securely holds latch 11 in its latching position against any accidental or undesired disengagement due, for instance, to strong shocks or vibrations. Spring 12 may, therefore, be quite weak, producing sufficient bias only to return the latch from its momentarily depressed to its fixed end position.

As shown in FIG. 1, when key K is inserted and wedge element 16, which fits recess 15, firmly couples lock cylinder 3 to lock barrel 2 against axial displacement of the lock cylinder, turning of the key will retract steering column bolt 6 and the latch 11 will keep the bolt retracted under the firm bias of bolt spring 9 in every rotary position of the lock cylinder because the spring bias will firmly wedge latch face 11" against the rim of annular collar 19 of the lock cyliner. Thus, even when lock cylinder 3 is rotated into a position wherein driving cam 7 and cam follower 8 are no longer in engagement (ready-to-lock position), bolt 6 will not be advanced under the pressure of spring 9 into a steering column locking position because latch 11 remains wedged between the bolt and the lock cylinder to prevent such a locking movement of the bolt, the bias of spring 9 making this wedging action so secure that it will withstand considerable shocks or vibrations.

Only removal of key K from keyhole 17 will terminate the wedging action. As the key is withdrawn axially past wedge element 16, thus no longer blocking the radial inward movement of the wedge element, the strong bias of bolt spring 9 will press bolt 6 from its retracted position shown in FIG. 1 towards the locking position shown in FIG. 2. While bolt 6 is being so displaced, wedge face 11" of latch 11 will press against annular collar 19 of lock cylinder 3, exerting a camming action and axially outwardly displacing the lock cylinder, the lock cylinder being uncoupled from the lock barrel to make this axial displacement possible by the camming action of frusto-conical face 15' of ring 13 on contacting face 16" of wedge element 16, which forces the wedge element radially into keyhole 17 and out of recess 15, as shown in FIG. 2. Meanwhile, as latch 11 rides over the rim of collar 19, it will be biased counterclockwise by soft spring 12 into recess 20. As the wheel is turned slightly to bring the keeper recess in the steering column into registry with keeper 27 of the bolt, bolt spring 9 will press the keeper into the keeper recess to lock the steering column. The engagement of the keeper in the keeper recess, i.e. the further slight displacement of keeper 27 into the recess, is made possible by recess 20 enabling latch 11 to move in the direction of the bolt movement in the locking position.

Recess 20 defined by annular collar 19 of lock cylinder 3 has a further function. As is known, after the lock cylinder has been axially outwardly displaced in the locking position, it must be axially inwardly displaced again by the insertion of key K, which causes wedge element 16 to move radially outwardly. The resultant camming action between contacting frusto-conical faces 15' and inclined face 16" forces the lock cylinder axially inwardly as the point of key K moves against including face 16' of the wedge element. As is obvious from a consideration of FIG. 2, this inwardly movement of the lock cylinder is resisted by the counterclock bias of soft spring 12 pressing latch 11 against the lock cylinder. To counteract this bias and thus to make the inward axial movement of the lock cylinder easier for the key operator, a relatively weak coil spring 21 is mounted in recess 22 of lock barrel 2 to press against slide 23 mounted between spring 21 and driving cam 7. Compression spring 21 biases slide 23 against the driving cam and thus presses lock cylinder 3 axially inwardly against the bias of spring 12. Thus, return spring 21 will automatically press the lock cylinder back into the ready-to-rotate position of FIG. 2 after key K has been withdrawn. Obviously, slide 23 could engage any other projecting portion of cylinder 3 as long as the slide moves the cylinder axially inwardly under the action of spring 21 against the action of spring 12. It will be apparent from the above description of the operation of the lock that the bias of spring 9 must exceed that of spring 21 and the bias of spring 21 must exceed that of spring 12, i.e. spring 12 must be stronger than spring 11 but weaker than spring 9 which is the operating spring of the lock.

Figures 3, 4, 5:
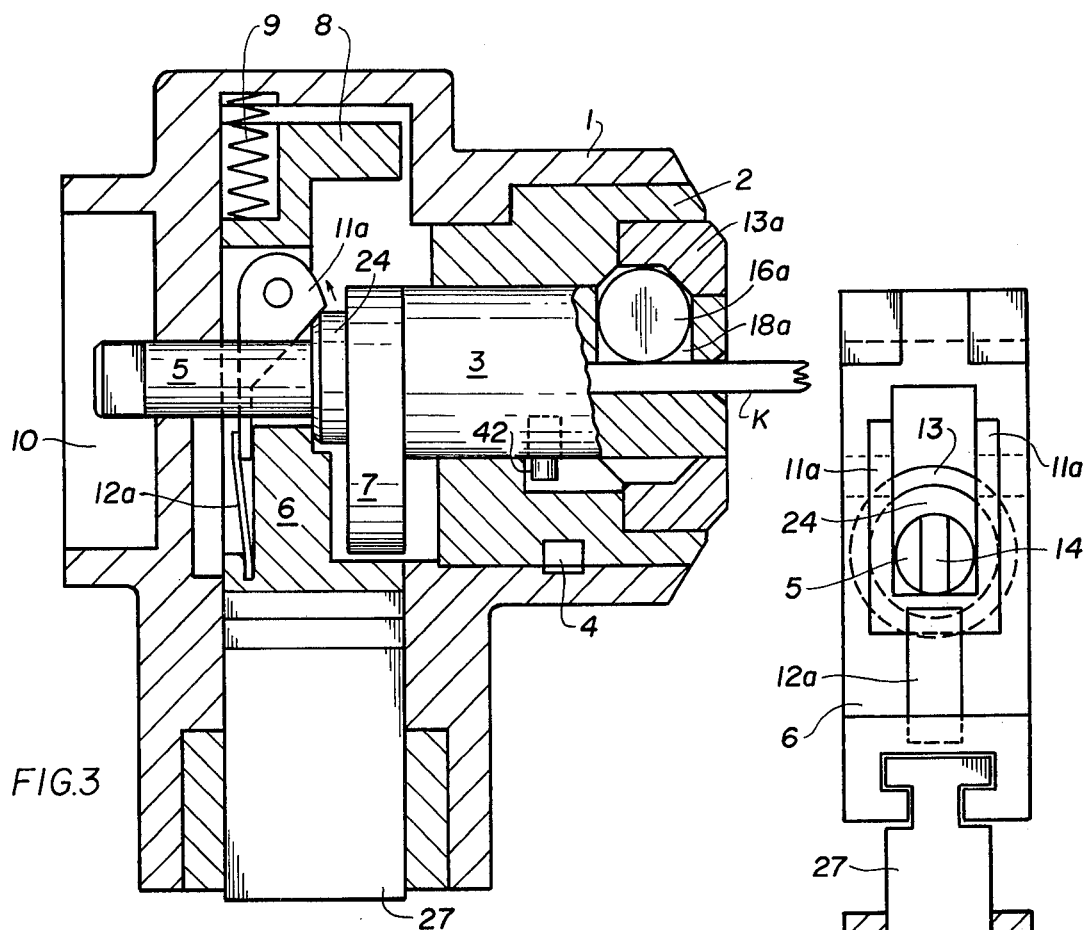
FIG. 3 is similar to FIG. 1 and shows another embodiment of the steering lock.
FIG. 4 shows the lock of FIG. 3 in the position of FIG. 2.
FIG. 5 is an end view of the locking bolt of FIGS. 3 and 4.

Referring now to FIGS. 3 to 5, the embodiment illustrated therein is, in most respects, like that of FIG. 1 and 2, and like reference numerals have been applied to like parts operating in a like manner to avoid redundancy in the description. In this embodiment, no automatic return of the lock cylinder in its original axial position is provided. Instead of annular collar 19 defining recess 20 at the inner end of the lock cylinder, the axially displaceable lock cylinder of this embodiment carries cylindrical projection 24 to cooperate with spring-biased latch 11a. The latch again is pivotally mounted on bolt 6 and has a protruding nose engaging the inner end of the lock cylinder. Latch 11a is biased in a counterclockwise direction against the lock cylinder by soft leaf spring 12a. In the locking position of bolt 6 (FIG. 4) the noseof latch 11a presses softly against the flat face of projection 24, i.e. when the car is parked, the lock cylinder is maintained in the desired axial position and will not be axially displaced accidentally or by playing children, for instance. In the ready-to-drive or drive position wherein the bolt is unlocked (FIG. 3), the left spring 12a will return latch 11a into position wherein one of the wedge faces of the latch engages the rim of projection 24, thus firmly wedging the lock cylinder in its axial position in the manner described herein-above in connection with FIG. 1.

The end view of FIG. 5 illustrates the arrangement of bolt 6, the mounting of bolt keeper 27 on the bolt, and the configuration of latch 11a which comprises two arms for engagement with the end of lock cylinder 3 at either side of driver element 5.

In addition to the elimination of automatic return spring 21 and the differences in the shapes and arrangements of the latch and end of lock cylinder 3, as described, the embodiment of FIGS. 3–5 differs from that of FIGS. 1 and 2 in the coupling which holds the lock cylinder against axial displacement with respect to lock barrel 2. Lock cylinder 3 of FIGS. 3 and 4 has no head of enlarged diameter but ring 13a has an inwardly extending flange in engagement with the outer end of the cylinder. As in the first-described embodiment, this ring defines a frusto-conical face 15' defining a recess 15 for receiving a wedge element slidingly mounted in radial slot 18a in the lock cylinder. In this embodiment, the wedge element is a disc 16a operating in the same manner as wedge element 16. The circular disc will roll along the slope of face 15' during radial displacement of the disc between the coupled and uncoupled positions shown respectively in FIGS. 3 and 4.

Figure 6:
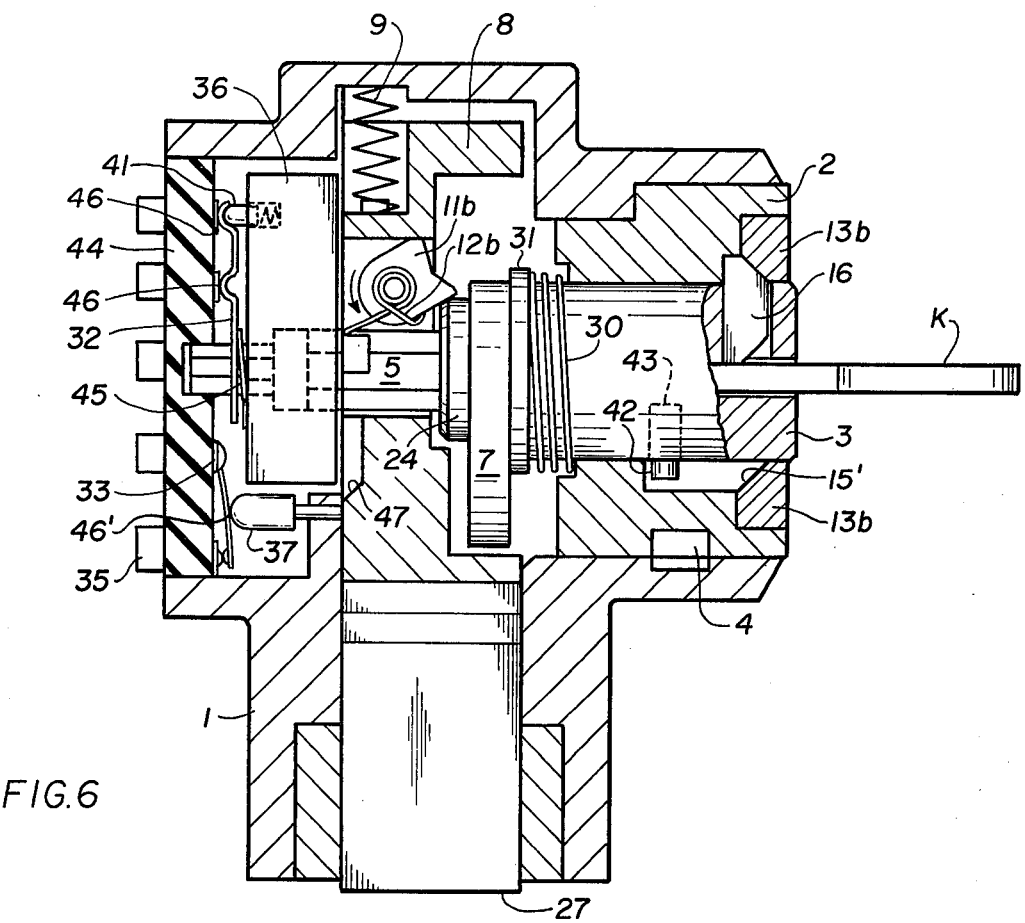
FIG. 6 is similar to FIG. 1 and shows a further embodiment.
Figure 7:
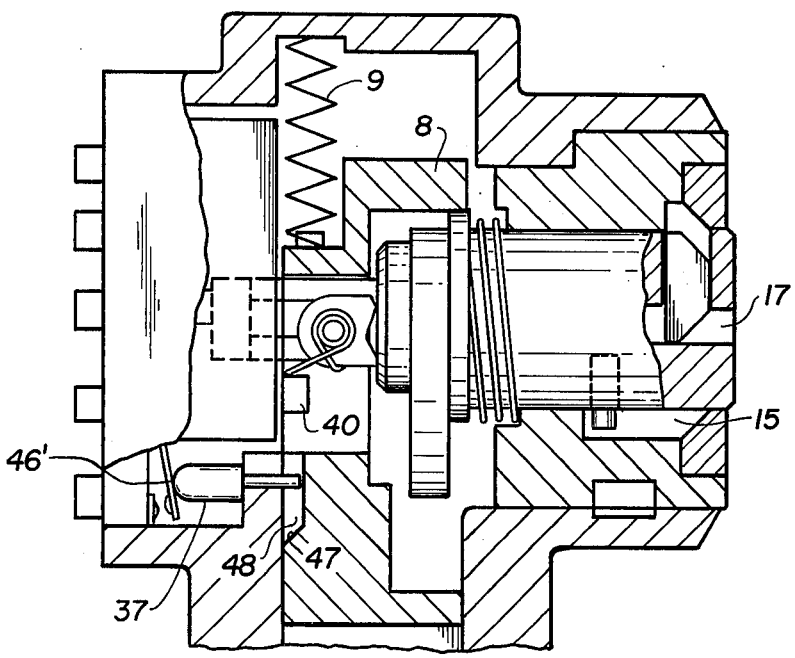
FIG. 7 shows the lock of FIG. 6 in the position of FIG. 2.

FIGS. 6 and 7 illustrate another embodiment of a coincidental lock with automatic return of the lock cylinder into its axial working position and since this embodiment, too, is in most respects similar to those previously described, the same reference numerals are applied to like parts functioning in a like manner to avoid redundancy in the description.

In this embodiment, the automatic return of lock cylinder 3 is accomplished by spiral spring 30 wound about the cylinder near its inner end, the spring being compressed between flange 31 on cylinder 3 and a shoulder in lock barrel 2 so as to bias the lock cylinder axially inwardly towards lock bolt 6.

The lock cylinder carries cylindrical projection 24 at its inner end for engagement by latch 11b which is biased against projection 24 by spring 12b. In the operating position shown in FIG. 6, the latch is wedged firmly against the rim of projection 24 to hold the lock cylinder against axial displacement, the latch being pressed against the rim by operating spring 9 while its counterclockwise rotation is prevented by the end wall of the elongated slot in bolt 6 wherein the latch is pivotally mounted, the force of the wedging action depending on the bias of spring 9 which is selected relatively strong. At the same time, the lock cylinder is coupled to the lock barrel by wedge element 16 held in position by ring 13b. As in the other embodiment, removal if ignition key K will produce the locking position of FIG. 7 wherein latch 11b engages the flat face of lock cylinder projection 24. Spiral spring 30 is weaker than lock operating spring 9 but strong enough to overcome the bias of latch spring 12b in the locking position of FIG. 7. Spring 12b is soft and, as in all embodiments, serves merely to maintain the latch in engagement with the lock cylinder end in all pivotal positions of the latch, one end of the spring bearing against abutment 40 while the other end engages one of the wedge faces of latch 12b bias the same counterclockwise. Since spring 30 will maintain the lock cylinder in the operating position after the key has been withdrawn, insertion of the key will require the operator only to slide wedge element 16 radially out of its uncoupled position (FIG. 7) into its coupling position (FIG. 6), which will be accomplished substantially without resistance as the tip of the key engages the sloped face of the wedge element. No spring force will have to be overcome in starting the car. Spring 30 maintains the lock cylinder in an axial position ready for rotation of the cylinder so that the key may be turned immediately.

Rotation of the lock cylinder into its various operating positions is controlled by radial lug 42 extending from the periphery of the lock cylinder into guide groove 43 in the lock barrel. When lock cylinder 3 has been rotated into the ON-position for driving, driving cam 7 will retract bolt 6 to remove keeper 27 from the keeper recess in the steering column and thus unlock the steering column. As bolt 6 is retracted, latch 11b will slide out of engagement with the flat face of lock cylinder projection 24 and spring 12b will pivot the latch counterclockwise against the end wall in the elongated slot of bolt 6. The relatively strong pressure of spring 9 will press a wedge face of the latch against the bevelled rim of projection 24, as shown in FIG. 6, to provide a firm wedging action between bolt 6 and lock cylinder 3. This strongly holds the bolt in its retracted position against any possibility of accidental displacement into the locking position when driving cam 7 is turned into the position of FIG. 6 wherein it no longer engages cam follower 8 of bolt 6 after the ignition has been fired.

Details of the electrical circuitry controlled by the rotation of lock cylinder 3 are also shown in FIG. 6, this circuitry being generally conventional. The driver element 5 of the lock cylinder controls the switches of the operating circuit. Contact carrier 36 is keyed to driver element 5 for rotation therewith and carries spring-biased contact pin 41 for selected contact with sliding contacts 46 carried on insulating plate 44 mounted on housing 1. Leaf spring 45 biases spring contact 32 into engagement with spring-biased contact pin 41 which presses contacts 32 and 46 into sliding engagement for selectively closing various operating circuits, depending on the rotary position of lock cylinder 3 and contact 32.

To connect the door contact with a warning buzzer when the door is opened while the ignition key remains inserted, additional spring contact 46' is mounted on contact carrier plate 44. The bias of this spring contact is strong enough to displace sliding pin 37 in an axial direction into recess 48 in bolt 6 when contact 46' is open. The sliding pin is made of electrically insulating material and is mounted in an axially extending bore in housing 1. When key K is withdrawn and spring 9 moves the bolt into the locking position shown in FIG. 7, contact spring 46' will press pin 37 into recess 48. When the bolt is retracted, as shown in FIG. 6, the warning contact will be automatically disconnected under its own spring bias when sliding pin 37 can be displaced into recess 48. However, this warning contact will be closed when the beveled face 47 of the recess presses sliding pin 37 against spring contact 46'.

What is claimed is:

1. A lock arrangement for a motor vehicle having a steering column which comprises
    1. a housing defining an axial bore and a cross bore intersecting therewith,
    2. a key controlled lock cylinder mounted in the axial bore of the housing for axial displacement between an inwardly and an outwardly displaced position, and for rotation about the axis of the bore in the inwardly displaced position into selected operating positions,
    3. a lock bolt mounted in the cross bore for displacement between a retracted position and a locking position, the bolt having a keeper engaging the steering column in the locking position,
    4. actuating means arranged to displace the lock bolt between the retracted and locking positions, the bolt actuating means including
        a. an operating spring biassed to displace the lock bolt into the locking position and b. a driving member operated by the rotation of the lock cylinder to displace the bolt against the bias of the operating spring into the retracted position to disengage the keeper from the steering column, and 5. latch means mounted on the lock bolt for pivoting in the direction of the keeper, the latch means including
  a. a latch having a wedge face,
  b. a soft spring biasing the latch in a direction opposite to the pivoting direction, and
  c. the lock cylinder having an end rim adjacent the bolt, and the latch being arranged to cause the operating spring to wedge the wedge face thereof firmly against the lock cylinder rim when the bolt is in the retracted position and the lock cylinder is in the inwardly displaced position whereby the bolt is securely maintained in the retracted position, the firm wedge being removed on withdrawal of the key from the lock cylinder and the operating spring displacing the lock bolt and correspondingly driving the wedge face of the latch over the end rim to cause outward displacement of the lock cylinder.

2. The lock engagement of claim 1, further comprising an annular collar constituting the end rim on the lock cylinder, the collar defining a recess, the latch being arranged to be received in the recess in the locking position of the lock bolt.

3. The lock arrangement of claim 1, further comprising spring means arranged to bias the lock cylinder into the inwardly displaced position in the locking position of the lock bolt.

4. The lock arrangement of claim 3, further comprising a lock barrel mounting the lock cylinder for axial displacement therein, the spring means being a compression spring mounted between the lock barrel and lock cylinder for axially biassing the lock cylinder in relation to the lock barrel towards the bolt.

5. The lock arrangement of claim 3, further comprising a lock barrel mounting the lock cylinder for axial displacement therein, the lock cylinder having an annular flange near the end rim thereof, the spring means being a spiral spring wound about the lock cylinder and mounted between the annular flange and the lock barrel for axially biassing the lock cylinder in relation to the lock barrel towards the bolt.

6. The lock arrangement of claim 3, wherein the bias of the spring means is stronger than that of the soft spring but weaker than that of the operating spring.

7. The lock arrangement of claim 1, further comprising a cylindrical projection whose periphery constitutes the end rim of the lock cylinder.

8. The lock arrangement of claim 7, further comprising a driver element axially extending from the cylindrical lock cylinder projection through an elongated slot in the bolt, the latch being mounted on the lock bolt in the elongated slot and comprising two arms defining a space therebetween through which the driver element extends whereby the latch engages the lock cylinder projection at both sides of the driver element.

9. The lock arrangement of claim 1, further comprising a lock barrel mounting the lock cylinder for axial displacement therein, the lock cylinder defining an axially extending keyhole for insertion of the key and a radial bore communicating with the keyhole near the outer end of the lock cylinder opposite the end rim, a ring mounted in the lock barrel adjacent the outer lock cylinder end, the ring having a frusto-conical wall defining a recess between the cylinder and barrel, and a wedge element slidingly mounted in the radial bore for sliding movement between a position wherein the frusto-conical wall slides it into the keyhole in the absence of the key and out of the recess between the cylinder and barrel, and a position wherein the inserted key slides it out of the keyhole and into the recess for coupling the lock cylinder to the lock barrel against axial displacement of the lock cylinder.

10. The lock arrangement of claim 9, wherein the wedge element is a circular disc.

* * * * *